Figure 1:
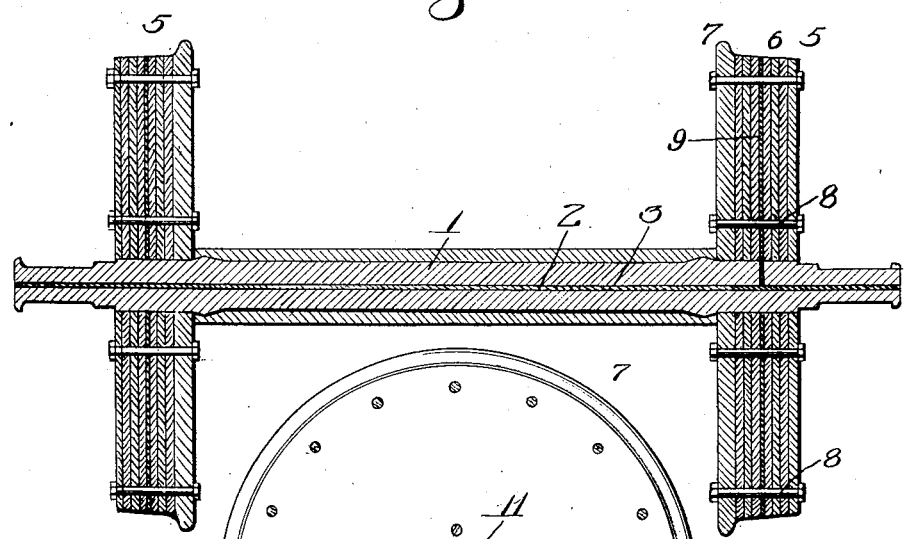

No. 810,525. PATENTED JAN. 23, 1906.
L. P. FERTIG.
COMBINED CAR AXLE AND WHEEL STRUCTURE.
APPLICATION FILED APR. 3, 1905.

Witnesses
J. B. Weir
Robert H. Weir

Inventor:
Lewis P. Fertig
By Jno. G. Elliott
Atty

UNITED STATES PATENT OFFICE.

LEWIS P. FERTIG, OF CHICAGO, ILLINOIS.

COMBINED CAR AXLE AND WHEEL STRUCTURE.

No. 810,525.      Specification of Letters Patent.      Patented Jan. 23, 1906.

Application filed April 3, 1905. Serial No. 253,608.

*To all whom it may concern:*

Be it known that I, LEWIS P. FERTIG, a citizen of the United States, residing in the city of Chicago, county of Cook, and State of Illinois, have invented certain new and useful Improvements in a Combined Car Axle and Wheel Structure, of which the following is a specification.

This invention relates to improvements in combined car axles and wheels, the construction and connections of which are designed to destroy vibrations as far as may be and correspondingly reduce objectionable noise produced thereby.

My invention, however, more particularly relates to combined car-axle structures employed in elevated railways passing through business districts and other thickly-populated portions of cities and towns wherein the noise heretofore produced by such vibrations is detrimental to the business, health, and comfort of those in the immediate vicinity, and this particularly when such vibrations are augmented by the force and effect of utilizing the car axles and wheels as an electrical conductor connecting the propelling-motor with their rail, through which to conduct the current from the motor to the rail, and thereby close the electrical circuit.

It is a well known and recognized fact that the vibrations of any given metal, however resonant it may be, may be reduced in rate and amplitude by bringing into intimate and close contact therewith some other metal the rate and amplitude of vibrations of which are comparatively substantially less. Although it has long been well known, for example, that the plugging of a silver or gold coin with lead or tin or zinc or other metals which have vibrations of less rate and amplitude of vibrations, and particularly tin, will destroy the "ring" of a coin, a result which is commonly employed for detecting base-metal fillings in coins; but so far as I am aware this knowledge and fact has not heretofore been resorted to or employed for the purposes of destroying the vibrations and correspondingly the noise heretofore largely produced by car axles and wheels, notwithstanding their objection, and that various means have heretofore been resorted to without success in efforts to produce their destruction and remove this great objection, particularly in elevated-railway structures passing through densely-populated portions of cities and towns.

The object of my invention, therefore, is to so combine with the metals commonly employed in car axles and wheels other metals having a different rate and amplitude of vibrations and in such a manner that the vibrations of the one metal shall neutralize the vibrations of the other to a degree reducing the noise therefrom to a minimum.

A further object of my invention is to so arrange and secure together in combined car axle and wheel structures two or more metals differing in rate and amplitude of vibrations to a degree substantially reducing them by vibrations and which at the same time shall provide the best possible form of an electrical conductor, connecting the driving-motor of a car with the track-rail therefor when such rail is employed for forming a portion of the electrical circuit for said motor.

With these ends in view my invention consists in certain features of novelty in construction, combination, and arrangement of parts by which the said objects and certain other objects are hereinafter attained, all as fully described with reference to the accompanying drawings and particularly pointed out in the claims.

Figure 2:
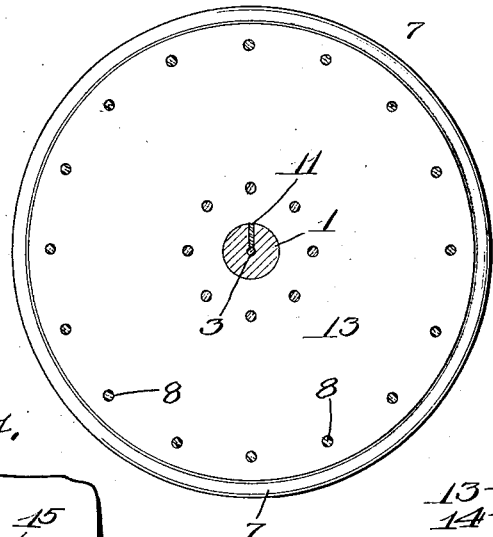
Figure 4:
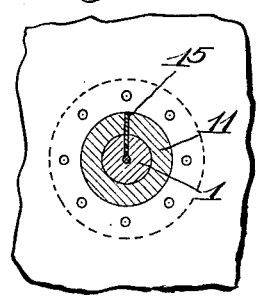
Figure 3:
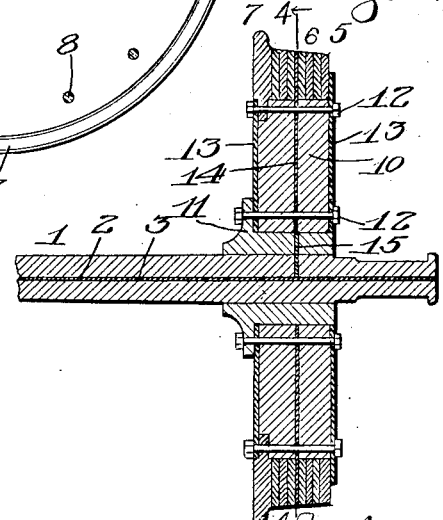

In said drawings, Figure 1 illustrates a vertical central longitudinal section of a combined car axle and wheel containing my invention; Fig. 2, a side elevation of the outer face of one of said wheels; Fig. 3, a detail vertical central section of a car axle and wheel, the wheel of which is a modification in form; and Fig. 4 a detail section on the line 4 4 of Fig. 3.

Similar numerals of reference indicate the same parts in the several views of the drawings.

1 indicates a car-axle the body of which is of the usual form, material, and construction, except that it is cored or bored out throughout its length, as indicated at 2, and this cored-out portion contains a metal filling 3, the vibrations of which differ both in rate and amplitude from that of which the material of the body of the axle is composed, which filling when the body of the axle is of iron is preferably of copper, the vibrations of which not only neutralize those of the axle, and vice versa, but is the best possible electrical conductor, and therefore desirable of use when the wheel and axle are utilized for closing an electrical circuit between the motor driving the car and the track-rail therefor.

The filling 3 may be inserted by having it in the form of a rod driven tightly in the bore or by having the rod screw-threaded therein; but in practice in order to obtain the best results the filling is preferably run into the bore while in a molten condition, for the reason that thereby a more perfect and greater area of contact between the filling and the axle is insured and the performance of its intended function correspondingly promoted.

Secured upon the axle by shrinking or other well-known means commonly employed for that purpose are car-wheels 5 5, which, as shown in Fig. 1, preferably consist of a plurality of metal plates, respectively providing a tread 6 and flange 7 for the wheels, which plates are bound together by a series of headed bolts 8, which may be in any desired number and at such intervals of the face of the wheel as may be preferred.

Plates are of differing materials, and particularly of materials which differ both in rate and amplitude of vibration—as, for example, disk plate 9—may be and preferably is of copper and the plates on one side thereof, including the flange-plate 7, of wrought or malleable iron and the plates on the opposite side—that is to say, between the copper plate 9 and the outer face of the tread portion 6—of the same or differing materials, and in some instances every disk plate or each alternate plate may differ in material—that is to say, be composed of materials each differing in rate and amplitude of vibration from the other—and so also the bolts 8 may be of a material differing in these respects from one or more of the disk plates forming the tread and flange of the wheel. In practice, however, good results of the desired ends herein set forth are secured by having a centrally arranged disk plate 9 of copper and all the other plates, including the flange-plate and the bolts 8, of cast or malleable iron; but still better results are obtained by having the bolts composed of copper when the plate 9 is of copper and when all or a majority of the other plates are of iron.

In Fig. 3 my invention is illustrated in connection with the paper car-wheel—that is to say, in which the web portion 10 is of paper confined between a hub 11, secured to the axle 1 in the usual way—and a series of annular rings forming, respectively, the tread 6 and flange 7 of the wheel by means of bolts 12 and plates 13 13. In paper wheels when it is desired to have the wheel and axle close the circuit between an electric motor and the track-rail an annular ring of copper interposed between annular rings of iron forming the face and tread of the wheel may be connected with the copper filling 3 in the axle by means of one or more wires; but in practice the copper portion of the paper wheel, as shown in Fig. 3, preferably consists of a disk 14, extending from the hub to the face of the tread of the wheel and connected by means of a copper plug or wire 15, electrically connected with the disk 14 and the copper filling 3, as shown in Fig. 3.

As the electrical feature of my invention is but incidental thereto and rendered possible and practical thereby and in the description of which I have specifically referred only to the employment of iron and copper, it should be understood that my invention includes the employment of two or more metals or the employment of a metal and some other substance adapted for car axles or wheels so long as there is between such materials a difference in rate and amplitude of vibrations as will produce such a reduction in their resonance when in operation as to substantially reduce objectionable and disagreeable sounds, and particularly when vibrations and sounds produced by jars are increased and augmented by the force or energy of an electrical current passing through either or both a car-wheel or a car-axle.

While I have illustrated and described my invention as included in a combined car axle and wheel structure, it should be observed that it would be no substantial departure therefrom to employ it in the axle to the exclusion of the wheels, and vice versa.

My invention also includes as a further means of reducing the rate and amplitude of the vibrations of the car-axle the employment of a soft-metal covering 16, preferably of lead, but may be of any of the other so-called "soft" metals, and which may be tightly and closely secured to the axle by either melting it or compressing it thereon, and in practice it is preferred to have the ends of this soft-metal covering fit tightly against the flanges 7 of the wheels and to this extent reduce the rate of vibrations and their amplitude.

Having described my invention, what I claim, and desire to secure by Letters Patent, is—

1. A combined car wheel and axle, the axle of which has a cored-out portion filled with a non-liquid metal differing in rate and amplitude of vibration from the body of the axle, substantially as described.

2. A combined car wheel and axle, the axle of which has a cored-out portion filled with a hard metal differing in rate and amplitude of vibration from the body of the axle, substantially as described.

3. A combined car wheel and axle, the axle of which has a cored-out portion extending from end to end and containing a hard metal, the rate and amplitude of vibration of which differs from that of the body of the axle, substantially as described.

4. A car-axle having a cored-out portion filled with a non-liquid metal differing in rate and amplitude of vibration from the body of the axle and wheels mounted thereon composed of metals also differing in rate and amplitude of vibration, substantially as described.

5. A car-axle having a cored-out portion filled with a hard metal differing in rate and amplitude of vibration from the body of the axle and wheels mounted thereon composed of metals also differing in rate and amplitude of vibration, substantially as described.

6. A car wheel and axle structure comprising in combination a car-axle cored out from end to end and filled with a hard metal differing in rate and amplitude of vibration from the body of the axle and wheels mounted thereon composed of a plurality of plates, the rate and amplitude of vibration of some or all of which differs, substantially as described.

7. A combined car axle and wheel structure, comprising in combination an axle, the core of which is composed of copper and differs in rate and amplitude of vibrations from the material of which the body of said axle is composed, a wheel secured upon said axle and composed of a plurality of plates, one of which is also of copper, and differs in rate and amplitude of vibrations from the other plates, and means electrically connecting said copper plate with the core of the axle, substantially as described.

8. A combined car axle and wheel structure, the axle of which comprises in combination a cored-out portion filled with a material, the rate and amplitude of the vibrations of which differ from the body of the material, said axle being surrounded with a third material, the rate and amplitude of vibrations of which differ from said body portion, substantially as described.

LEWIS P. FERTIG.

Witnesses:
  Jno. G. Elliott,
  M. S. Reeder.